(12) United States Patent
Kato (10) Patent No.: US 8,432,555 B2
(45) Date of Patent: Apr. 30, 2013

(54) IMAGE PROCESSING APPARATUS, IMAGE PROCESSING METHOD, COMPUTER-READABLE MEDIUM AND COMPUTER DATA SIGNAL

(75) Inventor: Masahiro Kato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 967 days.

(21) Appl. No.: 12/469,631

(22) Filed: May 20, 2009

(65) Prior Publication Data

US 2010/0149604 A1    Jun. 17, 2010

(30) Foreign Application Priority Data

Dec. 17, 2008   (JP) ................................. 2008-320644

(51) Int. Cl.
*G06F 17/20* (2006.01)

(52) U.S. Cl.
USPC ............................ 358/1.11; 358/505; 715/255

(58) Field of Classification Search .................. 358/1.1, 358/1.11, 505; 707/755; 715/200, 243, 255
See application file for complete search history.

(56) References Cited

U.S. PATENT DOCUMENTS

2006/0085466 A1   4/2006   Ye et al.
2006/0085740 A1   4/2006   Ye et al.

FOREIGN PATENT DOCUMENTS

| JP | 11-238096 A | 8/1999 |
| JP | 2000-148752 A | 5/2000 |
| JP | 3767180 B2 | 2/2006 |
| JP | 2006-146894 A | 6/2006 |

OTHER PUBLICATIONS

Office Action from China Patent Office dated Aug. 24, 2010.

*Primary Examiner* — King Poon
*Assistant Examiner* — Lawrence Wills
(74) *Attorney, Agent, or Firm* — Sughrue Mion, PLLC (57) ABSTRACT

An image processing apparatus includes a document image acquiring unit, a first specifying unit and a second specifying unit. The document image acquiring unit acquires a document image representing a document. The first specifying unit specifies positions, in the document image, of a plurality of areas in interest which are arranged in a specific direction and which correspond to each other. The second specifying unit specifies a start position of an item in the document, based on the positions of the areas in interest.

10 Claims, 5 Drawing Sheets

FIG. 5

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-320644 filed on Dec. 17, 2008.

BACKGROUND

1. Technical Field

The invention relates to an image processing apparatus, an image processing method, a computer-readable medium storing a program and a computer data signal embedded with the program.

2. Related Art

There is an image processing apparatus that specifies a character string included in a document by, for example, executing a character recognition process for a document image representing the document with an optical character reader or the like. Also, there is a technique for specifying a start position of an item, such as a line head symbol for itemization, in the document or analyzing the structure of the document, based on the specified character string.

SUMMARY

According to an aspect of the invention, an image processing apparatus includes a document image acquiring unit, a first specifying unit and a second specifying unit. The document image acquiring unit acquires a document image representing a document. The first specifying unit specifies positions, in the document image, of a plurality of areas in interest which are arranged in a specific direction and which correspond to each other. The second specifying unit specifies a start position of an item in the document, based on the positions of the areas in interest.

BRIEF DESCRIPTION OF THE DRAWINGS

Exemplary embodiments of the invention will be described below in detail based on the accompanying drawings, wherein.

DESCRIPTION OF PREFERRED EMBODIMENTS

Exemplary embodiments of the invention will now be described in detail below with reference to the accompanying drawings.

Figure 1:
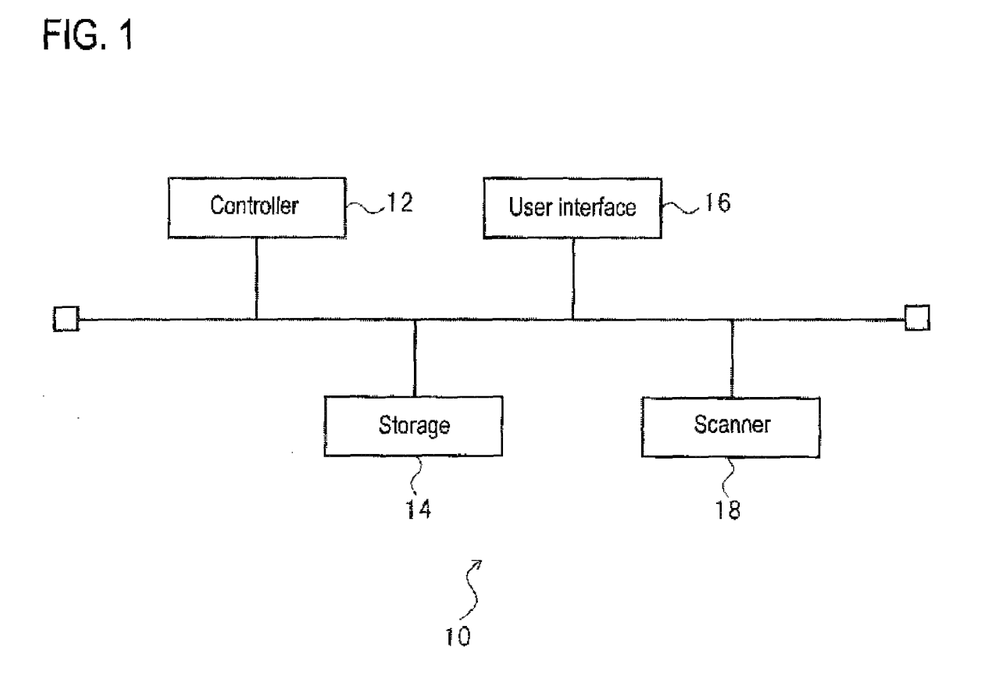
FIG. 1 is a diagram illustrating an exemplary hardware structure of an image processing apparatus according to an exemplary embodiment of the invention.

FIG. 1 is a diagram illustrating an exemplary hardware structure of an image processing apparatus 10 of this exemplary embodiment. As exemplified in FIG. 1, the image processing apparatus 10 of this exemplary embodiment includes a controller 12, a storage 14, a user interface (UI) 16 and a scanner 18. These components are connected to one another through a bus or the like. The controller 12 is a program control device such as a CPU and operates in accordance with a program installed in the image processing apparatus 10. The storage 14 is a memory device such as a ROM or a RAM, a hard disk or the like. The storage 14 stores, for example, the program executed by the controller 12. The storage 14 also serves as a work memory for the controller 12. The UI 16 is a display, a microphone, a speaker, a button or the like, through which the contents of an operation performed by a user or audio input by the user is output to the controller 12. Furthermore, the UI 16 displays information or outputs audio in accordance with a command input from the controller 12. The scanner 18 optically reads an image formed on a paper medium or the like and outputs the read image to the controller 12 as image information.

Figure 2:
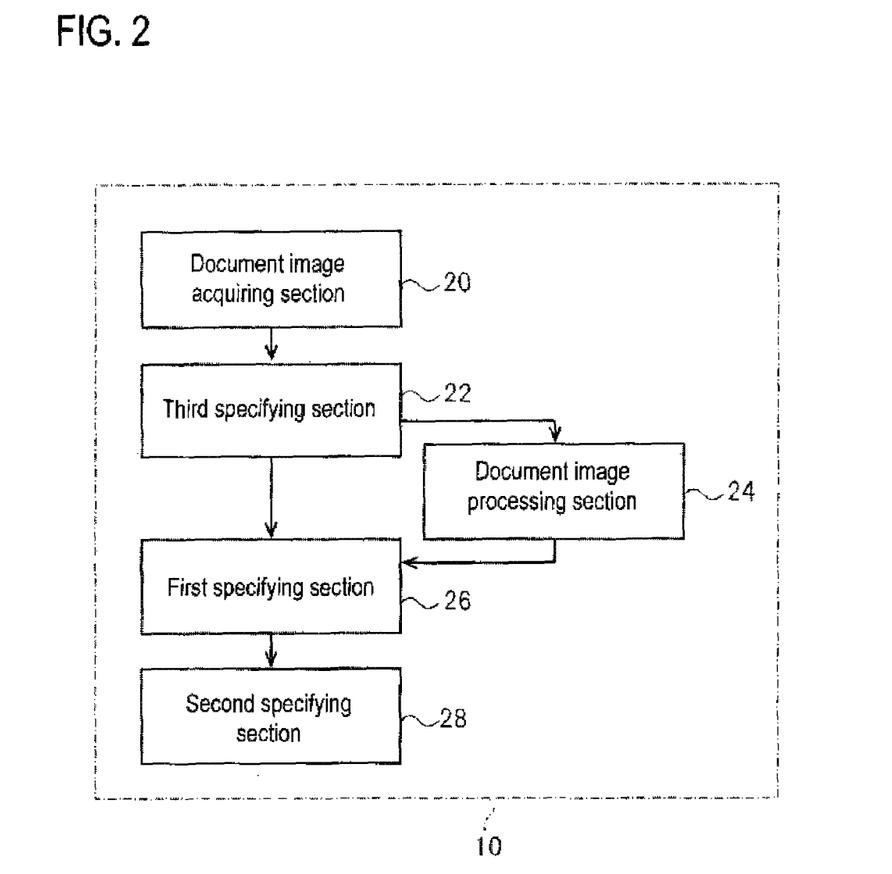
FIG. 2 is a functional block diagram illustrating exemplary functions implemented by the image processing apparatus of the exemplary embodiment.

FIG. 2 is a functional block diagram illustrating exemplary functions implemented by the image processing apparatus 10 of the exemplary embodiment.

As exemplified in FIG. 2, the image processing apparatus 10 exhibits its functions including a document image acquiring section 20, a third specifying section 22, a document image processing section 24, a first specifying section 26 and a second specifying section 28. These functions are implemented mainly by the controller 12.

The above functional sections are implemented by having the controller 12 execute the program installed in the image processing apparatus 10, which may be a computer. It is noted that the program is supplied to the image processing apparatus 10, for example, through a computer-readable information transmission medium such as a CD-ROM or a DVD-ROM, or through a communication network such as the Internet.

Figure 3:
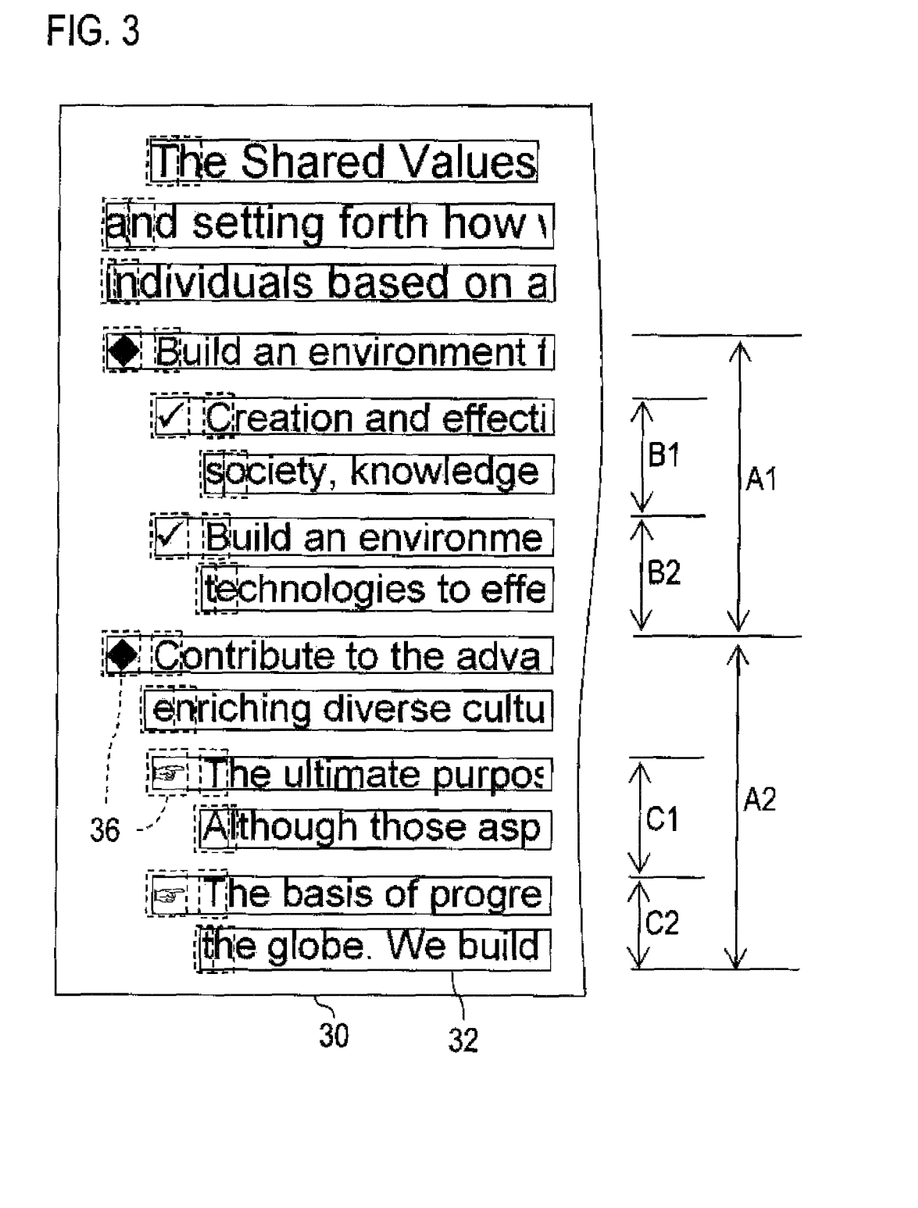
FIG. 3 is a diagram illustrating an exemplary document image.

The document image acquiring section 20 acquires a document image 30 exemplified in FIG. 3. In this exemplary embodiment, the document image 30 represents a document including plural characters. It is noted that although all of the characters shown in FIG. 3 are English-language characters, characters included in a document represented by a document image may be characters in any other language (e.g. Japanese language). In this exemplary embodiment, the document image acquiring section 20 may acquire the document image 30, for example, which is formed on a paper medium or the like and read by the scanner 18. In the case where the image processing apparatus 10 includes a communication section, the document image acquiring section 20 may acquire the document image 30 from an external device connected through a network. Alternatively, the document image acquiring section 20 may acquire the document image 30 that is stored in the storage 14 in advance. It is noted that the document image acquiring section 20 may perform, for the acquired document image 30, image processing such as an inclination correction process, an erecting process and a binarization process. In this exemplary embodiment, the document image acquiring section 20 performs the binarization process for the acquired document image 30.

The third specifying section 22 specifies plural unit areas that are arranged along a predetermined specific direction in the document image 30. Specifically, the third specifying section 22 specifies, for example, connected pixel components in each of which pixels having a given property are connected (more specifically, connecting black pixel components in which black pixels are connected, for example) in the document image 30. Furthermore, the third specifying section 22 specifies a text area including a text in the document image 30 based on positions of the connected pixel components in the document image 30. Based on the position of the connected pixel components in the text area, the third specifying section 22 specifies, by using a layout analysis technique or the like, unit areas such as band-shaped linear row areas 32 that are arranged in the vertical direction and extend in the lateral direction as exemplified in FIG. 3. It is noted that a unit area may be a band-shaped linear row area 32 extending in the vertical direction. Then, the third specifying section 22 specifies a row area feature (a feature of each row area 32). Specifically, the third specifying section 22 specifies, for example, (i) a position of a blank space (such as an area including no significant connected pixel component) that is present in the vicinity of each row area 32' and (ii) a position of each row area 32 in the document image 30 (such as a position of a line head or a line end of each row area 32) and determines as to whether or not a blank space is present at the line end of each row area 32.

Figure 4:
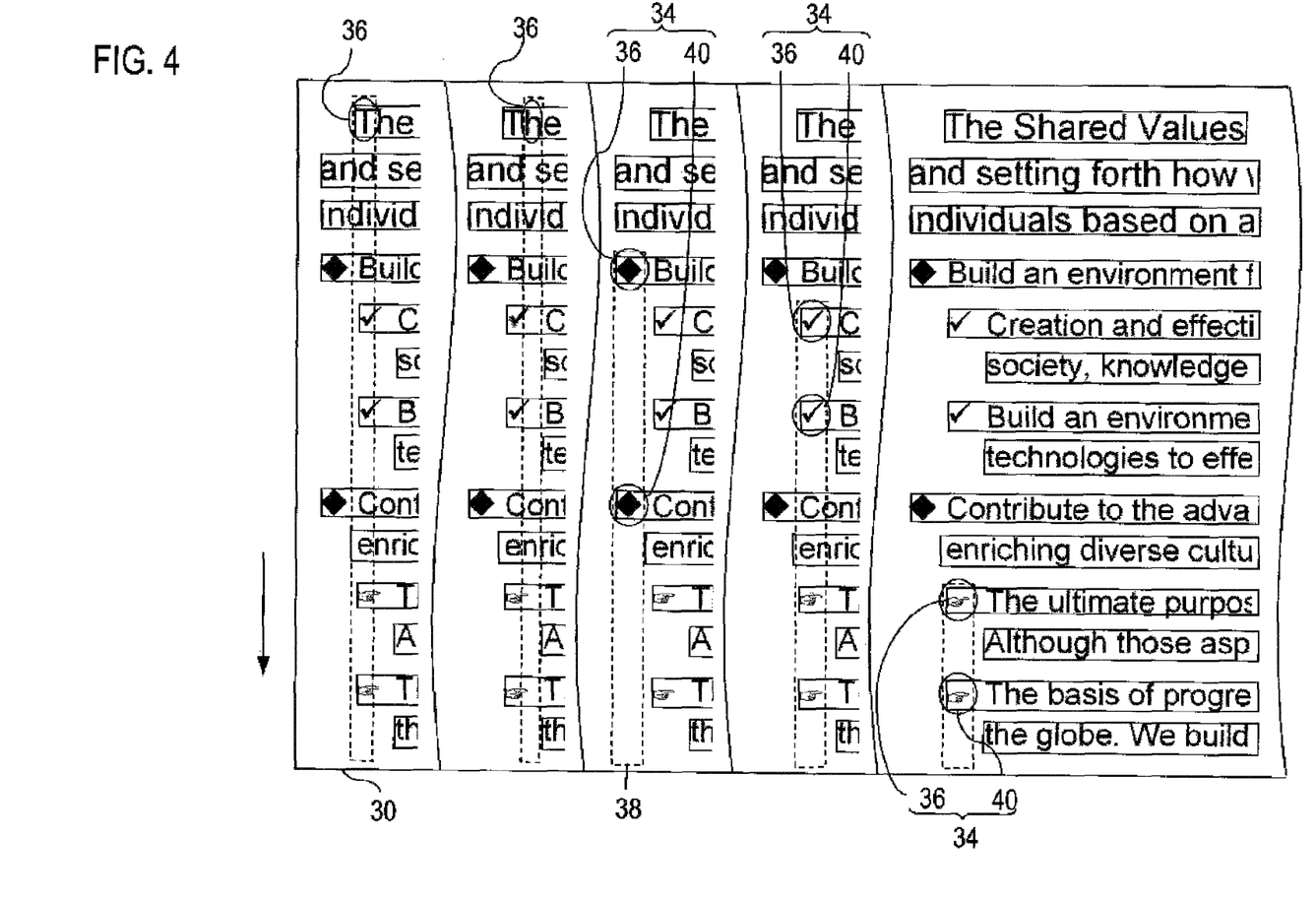
FIG. 4 is a diagram illustrating exemplary areas in interest.

The first specifying section 26 specifies positions of plural areas 34 in interest that are arranged along the specific direction and correspond to one another in the document image 30 (see FIG. 4). FIG. 4 is a diagram illustrating exemplary areas 34 in interest.

In this exemplary embodiment, specifically, the first specifying section 26 first extracts, for example, N (for example, two) connected pixel components from the left end of each row area 32, so as to specify areas including those extracted connected pixel components as candidate areas 36 (see FIG. 3). In this exemplary embodiment, the first specifying section 26 specifies the candidate areas 36 including the extracted connected pixel components without performing a character recognition process. Therefore, as exemplified in FIG. 3, one candidate area 36 does not always correspond to one character. For example, the candidate area 36 located in the fourth line from the bottom of FIG. 3 contains both of an itemization mark and a character.

Then, in this exemplary embodiment, the first specifying section 26 scans each candidate area 36 along a direction in which the unit areas (for example, the row areas 32) are arranged from the candidate area 36 (for example, along a direction perpendicular to the extending direction of each linear row area 32: the downward direction (a direction indicated by an arrow) in the example of FIG. 4) as exemplified in FIG. 4. Specifically, the first specifying section 26 specifies, for example, a vertically band-shaped linear scan area 38 extending in the downward direction from the position of each candidate area 36 and having a width corresponding to the width of each candidate area 36 (for example, having a width corresponding to a sum of the width of the candidate area 36 and a predetermined margin). Then, the first specifying section 26 checks as to whether or not there is, in the scan area 38, a correspondent candidate area 40 corresponding to the candidate area 36 (for example, a correspondent candidate area 40 has a feature, corresponding to the candidate area 36, of its partial image (such as a distribution of black pixels) included in the scan area). If there is a correspondent candidate area 40, the first specifying section 26 specifies a combination of the candidate area 36 and the correspondent candidate area 40 corresponding to the candidate area 36 as a combination of the plural areas 34 in interest that are arranged in the specific direction (for example, in the vertical direction) and correspond to each other. In this manner, based on the candidate area(s) 36 included in an end portion (at an end or in the vicinity of an end) of each unit area (such as a row area 32), the first specifying section 26 may specify areas 34 in interest included in the end portion of the unit area (such as the row area 32).

Thereafter, the first specifying section 26 specifies positions of these areas 34 in interest in the document image 30. Thus, the first specifying section 26 may specify the positions, in the document image 30, of the plural areas 34 in interest included in different unit areas (for example, the row areas 32). In the case exemplified in FIG. 4, the first specifying section 26 specifies: positions, in the document image 30, of the areas 34 in interest having a diamond-shaped connected pixel component; positions, in the document image 30, of areas 34 in interest having connected pixel components constituting check marks; and positions, in the document image, of area 34 in interest having connected pixel components constituting finger symbols. An area 34 in interest may be a partial area having connected pixel components constituting, for example, a bracket symbol, a period symbol, a circle-shape symbol for surrounding another character or a square-shape symbol for surrounding another character.

The first specifying section 26 may specify a position of an area 34 in interest that satisfies a predetermined area-in-interest condition (for example, a condition about a size of an area 34 in interest that is determined based on the document image 30).

Specifically, the first specifying section 26 specifies, for example, the largest rectangle among circumscribed rectangles of connected pixel components that cross a straight line extending from one point in a candidate area 36 along the aforementioned specific direction (for example, the vertical or downward direction). Alternatively, the first specifying section 26 specifies the largest rectangle among circumscribed rectangles of respective connected pixel components present in the text area. Also, the first specifying section 26 may specify a combination of the areas 34 in interest that are correspond to each other in a feature (for example, a color distribution) of partial images included in plural candidate areas where the respective row areas 32 cross the scan area 38 having a width corresponding to one side (or a long side) of this specified largest rectangular (for example, having a width obtained as a sum of one side (or the long side) of the largest rectangular and a margin).

Furthermore, when the area-in-interest condition that no connected pixel area including connected pixels satisfying a predetermined condition (for example, a connected pixel area that includes connected pixels having a given property (for example, black pixels) and exceeding in number a predetermined number) is present between a candidate area 36 and a correspondent candidate area 40 is satisfied, the first specifying section 26 may specify the candidate area 36 and the correspondent candidate area 40 corresponding to this candidate area 36 as the areas 34 in interest. Specifically, the first specifying section 26 may specify areas 34 in interest so that no connected pixel area including connected pixels satisfying the predetermined condition is present between the areas 34 in interest. It is noted that the first specifying section 26 may determine, based on a position of a line head of each row area 32, as to whether or not a connected pixel area including connected pixels satisfying the predetermined condition is present between a candidate area 36 and a correspondent candidate area 40.

If the area-in-interest condition that row areas 32 the number of which is equal to or larger than (or larger than) a predetermined number are present between a row area 32 including a candidate area 36 and another row area 32 including a correspondent candidate area 40 is satisfied, the first specifying section 26 may specify a combination of the candidate area 36 and the correspondent candidate area 40 corresponding to this candidate area 36 as a combination of areas 34 in interest. Furthermore, if a row area 32 including a candidate area 36 and another row area 32 including a correspondent candidate area 40 are adjacent to each other and if there is a blank space or the like at a line end of at least one of these adjacent row areas 32, the first specifying section 26 may specify a combination of the candidate area 36 and the correspondent candidate area 40 corresponding to this candidate area 36 as a combination of areas 34 in interest.

Moreover, if a row area 32 including a candidate area 36 and another row area 32 including a correspondent candidate area 40 are adjacent to each other, if there is no blank space or the like at the line end of at least one of these adjacent row areas 32, if another image corresponding to this candidate area 36 is not present in the row area 32 including the candidate area 36 and if another image corresponding to this correspondent candidate area 40 is not present in the row area 32 including the correspondent candidate area 40, the first specifying section 26 may specify a combination of these candidate area 36 and correspondent candidate area 40 as a combination of areas 34 in interest.

If there are plural correspondent candidate areas 40 (namely, there are three or more areas 34 in interest correspondent to one another), the first specifying section 26 may specify a candidate area 36 and the plural correspondent candidate areas 40 corresponding to the candidate area 36 as areas 34 in interest.

It is noted that the document image processing section 24 may perform, for the document image 30, processing (image processing) such as smoothing (blurring), smoothing and binarizing, or expansion/shrinkage. Thereafter, the first specifying section 26 may specify a position of an area 34 in interest based on the document image 30, which have been processed by the document image processing section 24.

If the plural different area-in-interest conditions described above are satisfied, the first specifying section 26 may specify a candidate area 36 and plural correspondent candidate areas 40 corresponding to the candidate area 36 as areas 34 in interest. Needless to say, the area-in-interest conditions are not limited to those mentioned above.

The second specifying section 28 specifies a start position of an item (for example, a mark for itemization) in the document represented by the document image 30 based on the position of the area 34 in interest. The second specifying section 28 specifies, for example, a position of a row corresponding to a row area 32 including an area 34 in interest, as the start row of an item (item start row). It is noted that the second specifying section 28 may determine as to whether or not each area 34 in interest corresponds to a symbol pattern that is stored in the storage 14 in advance, so as to specify an item start position based on the position of the area 34 in interest, which has been determined to correspond to the symbol pattern. Furthermore, if an image other than an area 34 in interest corresponding to the symbol pattern, which is stored in the storage 14 in advance, is not present in a row area 32 including the area 34 in interest, the second specifying section 28 may specify an item start position based on the position of the area 34 in interest.

Furthermore, the second specifying section 28 may specify the structure of the document represented by the document image 30 based on positions of plural areas 34 in interest.

Figure 5:
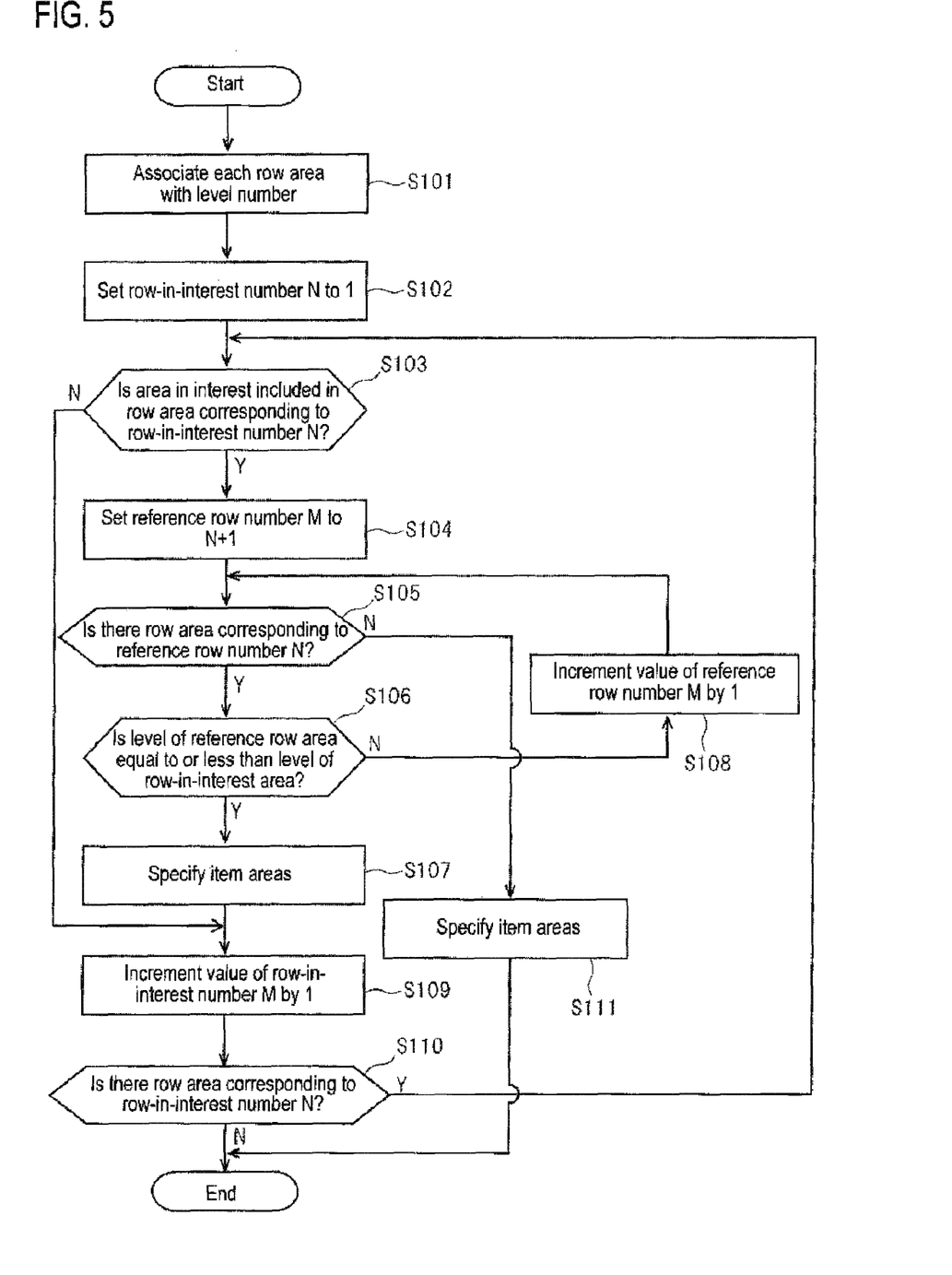
FIG. 5 is a flowchart illustrating an exemplary flow of a document structure specifying process performed by the image process apparatus of the exemplary embodiment.

Now, an exemplary flow of a document structure specifying process performed by the image processing apparatus 10 of this exemplary embodiment will be described with reference to a flowchart exemplified in FIG. 5.

First, the second specifying section 28 associates each row area 32 with a level number based on a start position of a connected pixel component located at its line head (for example, a character located at the line head) (S101). Specifically, in the case exemplified in FIG. 3, from row areas 32 each having a line head character in its leftmost position, the respective row areas 32 are successively associated with level numbers corresponding to the positions of their line-head characters. For example, the second specifying section 28 associates row areas 32 located in the second to fourth and ninth lines with a level number "1", associates row areas 32 located in the first, fifth, seventh, tenth, eleventh and thirteenth lines with a level number "2", and associates row areas 32 located in the sixth, eighth, and twelfth lines with a level number "3".

Then, the second specifying section 28 sets a row-in-interest number N to 1 (S102). Thereafter, the second specifying section 28 checks as to whether or not an area 34 in interest is included in a row area 32 (hereinafter referred to as a "row-in-interest area") corresponding to the row-in-interest number N, namely, a row area 32 having N in row number (S103).

If the area 34 in interest is included (Y in S103), the second specifying section 28 sets a reference row number M to N+1 (S104). Then, the second specifying section 28 checks as to whether or not there is a row area 32 (hereinafter referred to as a "reference row area") corresponding to the reference row number M (S105).

If there is a reference row area (Y in S105), the second specifying section 28 checks as to whether or not a level of the reference row area is equal to or less than the level of the row-in-interest area (namely, whether or not the level number associated with the reference row area is equal to or less than the level number associated with the row-in-interest area) (S106).

If the condition exemplified in S106 is satisfied (Y in S106), an area extending from the row-in-interest area (namely, the row area 32 corresponding to the row-in-interest number N) to a row area 32 located immediately before the reference row area (namely, a row area 32 located immediately before the row area 32 corresponding to the reference row number M (i.e., a row area 32 corresponding to a row number (M−1))) is specified as item areas corresponding to the row-in-interest number N and the reference row number M (or as itemization areas) (S107).

If the condition exemplified in S106 is not satisfied (N in S106), the second specifying section 28 increments the value of the reference row number M by 1 (S108), and the process exemplified in S105 is executed again.

If the process exemplified in S107 is completed or if an area 34 in interest is not included in the row area 32 corresponding to the row-in-interest number N in the process exemplified in S103 (N in S103), the second specifying section 28 increments the value of the row-in-interest number N by 1 (S109). Then, the second specifying section 28 checks as to whether or not there is a row area 32 corresponding to the row-in-interest number N incremented in the process exemplified in S109 (S110).

If there is such a row area 32 (Y in S110), the process exemplified in S103 is executed again; otherwise (N in S110), the process is terminated.

If it is determined that there is no reference row area (i.e., there is no row area 32 corresponding to the reference row number M) in the process exemplified in S105 (N in S105), in the same manner as in the process exemplified in S107, an area extending from the row-in-interest area (namely, the row area 32 corresponding to the row-in-interest number N) to the reference row area (namely, a row area 32 located immediately before a row area 32 corresponding to the reference row number M, i.e., a row area 32 corresponding to the row number (M−1)) is specified as an item area corresponding to the row-in-interest number N and the reference row number M (or as an itemization area) (S111), and the process is terminated.

By the aforementioned processes, in the case exemplified in FIG. 3, the second specifying section 28 specifies, in the document represented by the document image 30, an item area A1 from the fourth line to the eighth line, an item area B1 from the fifth line to the sixth line, an item area B2 from the seventh line to the eighth line, an item area A2 from the ninth line to the fourteenth line, an item area C1 from the eleventh line to the twelfth line, and an item area C2 from the thirteenth line to the fourteenth line. Needless to say, the second specifying section 28 may specify these item areas as itemization areas. Furthermore, the second specifying section 28 may determine as to whether or not the level associated with the item areas B1 and B2 corresponds to the level associated with the item areas C1 and C2, based on whether or not the patterns of the line head characters (line head symbols) of these item areas (for example, color distributions of image elements included therein) correspond to each other or whether or not the positions of the line head characters (line head symbols) of these item areas correspond to each other.

The second specifying section 28 may output, to the storage 14, information indicating the item areas in association with the document image 30 or document information including character strings created by executing the character recognition process for the document image 30. Also, the second specifying section 28 may create an image representing the position or the range of each item area for output to the UI 16 of the display or the like.

It should be noted that the invention is not limited to the aforementioned exemplary embodiment.

For example, the image processing apparatus 10 may be configured in one casing or in plural casings. It is noted that the specific numerical values and specific character strings herein mentioned are not restrictive, but merely exemplarily mentioned.

What is claimed is:

1. An image processing apparatus comprising:
   a document image acquiring unit that acquires a document image representing a document;
   a third specifying unit that specifies a first row and a second row in the document image, the first row comprising a first bullet and first text and the second row comprising a second bullet and second text;
   a first specifying unit that specifies a width of a vertical scan area in which bullets in rows of the document image are to be detected, scans the vertical scan area in the first row, detects the first bullet in the vertical scan area of the first row, scans the vertical scan area in the second row, detects the bullet in the vertical scan area of the second row, performs a comparison of the detected first bullet and the detected second bullet, determines that the first bullet matches the second bullet based on a result of the comparison, and determines a first position in the document image of the matching first bullet in the first row and a second position in the document image of the matching second bullet in the second row based on a result of the matching; and
   a second specifying unit that specifies a position of an item in the document, based on the first position and the second position, the item comprising information beginning at the first position and ending at a row in the document image preceding the second position.

2. The image processing apparatus according to claim 1, wherein features of partial images included in the vertical scan areas correspond to each other.

3. The image processing apparatus according to claim 1, wherein the vertical scan area is an end portion of the rows of the document image.

4. The image processing apparatus according to claim 1, wherein the vertical scan area in the first row and the vertical scan area in the second row satisfy a first condition.

5. The image processing apparatus according to claim 4, wherein the first condition relates to a size of the vertical scan area in the first row and the vertical scan area in the second row, the size being determined based on the document image.

6. The image processing apparatus according to claim 4, wherein the first condition includes a condition that no connected pixel area in which pixels satisfying a second condition are connected is present in the vertical scan area in the first row and the vertical scan area in the second row.

7. The image processing apparatus according to claim 1, further comprising:
   a document image processing unit that processes the document image.

8. The image processing apparatus according to claim 1, wherein the second specifying unit specifies a structure of the document based on the first position and the second position.

9. An image processing method comprising:
   acquiring a document image representing a document;
   specifying a first row and a second row in the document image, the first row comprising a first bullet and first text and the second row comprising a second bullet and second text;
   specifying a width of a vertical scan area in which bullets in rows of the document image are to be detected, scanning the vertical scan area in the first row, detecting the first bullet in the vertical scan area of the first row, scanning the vertical scan area in the second row, detecting the bullet in the vertical scan area of the second row, comparing the detected first bullet and the detected second bullet, determining that the first bullet matches the second bullet based on a result of the comparing, and determining a first position in the document image of the matching first bullet in the first row and a second position in the document image of the matching second bullet in the second row based on a result of the matching; and
   specifying a position of an item in the document, based on the first position and the second position, the item comprising information beginning at the first position and ending at a row in the document image preceding the second position.

10. A non-transitory computer-readable medium storing a program that causes a computer to execute image processing, the image processing comprising:
    acquiring a document image representing a document;
    specifying a first row and a second row in the document image, the first row comprising a first bullet and first text and the second row comprising a second bullet and second text;
    specifying a width of a vertical scan area in which bullets in rows of the document image are to be detected, scanning the vertical scan area in the first row, detecting the first bullet in the vertical scan area of the first row, scanning the vertical scan area in the second row, detecting the bullet in the vertical scan area of the second row, comparing the detected first bullet and the detected second bullet, determining that the first bullet matches the second bullet based on a result of the comparing, and determining a first position in the document image of the matching first bullet in the first row and a second position in the document image of the matching second bullet in the second row based on a result of the matching; and specifying a position of an item in the document, based on the first position and the second position, the item comprising information beginning at the first position and ending at a row in the document image preceding the second position.

\* \* \* \* \*